US008321083B2

(12) United States Patent
Beebe et al.

(10) Patent No.: US 8,321,083 B2
(45) Date of Patent: Nov. 27, 2012

(54) AIRCRAFT MAINTENANCE LAPTOP

(75) Inventors: Clifford A. Beebe, Snohomish, WA (US); Mir H. Hashimi, Everett, WA (US); Stephen E. Jahns, Federal Way, WA (US); Lee Victoria Bovey, Lynnwood, WA (US); Richard George Pigion, Issaquah, WA (US); Justin Eugene Hale, Woodinville, WA (US); Bryan Kesterson, Kent, WA (US)

(73) Assignee: The Boeing Company, Chicago, IL (US)

( * ) Notice: Subject to any disclaimer, the term of this patent is extended or adjusted under 35 U.S.C. 154(b) by 630 days.

(21) Appl. No.: 12/362,386

(22) Filed: Jan. 29, 2009

(65) Prior Publication Data

US 2009/0192659 A1    Jul. 30, 2009

Related U.S. Application Data

(60) Provisional application No. 61/024,756, filed on Jan. 30, 2008.

(51) Int. Cl.
*G01M 17/00* (2006.01)

(52) U.S. Cl. ........................... 701/29.1; 701/120

(58) Field of Classification Search .............. 701/29, 701/35

See application file for complete search history.

(56) References Cited

U.S. PATENT DOCUMENTS

| | | | |
|---|---|---|---|
| 3,748,597 A | 7/1973 | Reinhart | |
| 4,216,168 A | 8/1980 | Evans et al. | |
| 6,044,323 A | 3/2000 | Yee et al. | |
| 6,047,165 A | 4/2000 | Wright et al. | |
| 6,122,575 A | 9/2000 | Schmidt et al. | |
| 6,181,992 B1 | 1/2001 | Gurne et al. | |
| 6,313,759 B1 | 11/2001 | Musland-Sipper | |
| 6,385,513 B1 | 5/2002 | Murray et al. | |
| 6,438,468 B1 | 8/2002 | Muxlow et al. | |
| 6,529,706 B1 | 3/2003 | Mitchell | |
| 6,671,589 B2 | 12/2003 | Holst et al. | |
| 6,741,841 B1 | 5/2004 | Mitchell | |
| 6,748,597 B1 | 6/2004 | Frisco et al. | |
| 6,795,758 B2 | 9/2004 | Sinex | |
| 6,816,728 B2 | 11/2004 | Igloi et al. | |
| 6,816,762 B2 | 11/2004 | Hensey et al. | |
| 6,831,912 B1 | 12/2004 | Sherman | |

(Continued)

FOREIGN PATENT DOCUMENTS

DE    202006019993 U1    7/2007

(Continued)

OTHER PUBLICATIONS

U.S. Appl. No. 12/277,182, filed Nov. 24, 2008, Beck et al.

(Continued)

*Primary Examiner* — Hussein A. Elchanti
(74) *Attorney, Agent, or Firm* — Yee & Associates, P.C.

(57) ABSTRACT

An apparatus comprises a portable computer, and program code stored on the portable computer. The program code is capable of being executed to establish a communications link with an aircraft network data processing system in an aircraft, obtain information about the aircraft over the communications link, display the information on a display device for the portable computer, receive user input to control a data processing system on the aircraft network data processing system in the aircraft, and send a number of commands to the data processing system in response to receiving the user input.

20 Claims, 11 Drawing Sheets

U.S. PATENT DOCUMENTS

| | | | |
|---|---|---|---|
| 7,069,261 B2 | 6/2006 | Ahl et al. | |
| 7,151,985 B2 | 12/2006 | Tripmaker | |
| 7,219,339 B1 | 5/2007 | Goyal et al. | |
| 7,230,221 B2 | 6/2007 | Busse et al. | |
| 7,269,761 B2 | 9/2007 | Yi | |
| 7,292,579 B2 | 11/2007 | Morris | |
| 7,310,573 B2 * | 12/2007 | Stickling | 701/3 |
| 7,313,143 B1 | 12/2007 | Bruno | |
| 7,356,389 B2 | 4/2008 | Holst et al. | |
| 7,412,291 B2 | 8/2008 | Judd et al. | |
| 7,420,476 B2 | 9/2008 | Stiffler | |
| 7,437,715 B2 | 10/2008 | Chatsinchai et al. | |
| 7,516,168 B2 | 4/2009 | LeCrone et al. | |
| 7,541,483 B2 | 6/2009 | Goodbrand et al. | |
| 7,555,657 B2 | 6/2009 | Nasu | |
| 7,636,568 B2 | 12/2009 | Gould et al. | |
| 7,653,212 B2 | 1/2010 | Haughawout et al. | |
| 7,703,145 B2 | 4/2010 | Stelling et al. | |
| 7,720,975 B2 | 5/2010 | Erickson | |
| 7,734,287 B2 * | 6/2010 | Ying | 455/423 |
| 7,734,740 B2 | 6/2010 | To | |
| 7,747,531 B2 | 6/2010 | Cronce | |
| 7,756,145 B2 | 7/2010 | Kettering et al. | |
| 7,822,415 B2 | 10/2010 | Meyers et al. | |
| 7,904,608 B2 | 3/2011 | Price | |
| 7,908,042 B2 | 3/2011 | Brinkley et al. | |
| 7,974,939 B2 | 7/2011 | Nanjangud Bhaskar et al. | |
| 8,027,758 B2 | 9/2011 | Ferro et al. | |
| 8,045,143 B2 | 10/2011 | Harres | |
| 8,091,858 B2 | 1/2012 | Janich et al. | |
| 8,165,930 B2 | 4/2012 | Harnish et al. | |
| 8,185,254 B2 | 5/2012 | Brinkman | |
| 8,185,609 B2 | 5/2012 | Fuchs et al. | |
| 2002/0111720 A1 | 8/2002 | Holst et al. | |
| 2003/0003872 A1 | 1/2003 | Brinkley et al. | |
| 2003/0109973 A1 | 6/2003 | Hensey et al. | |
| 2003/0149670 A1 | 8/2003 | Cronce | |
| 2003/0188303 A1 | 10/2003 | Barman et al. | |
| 2003/0191559 A1 | 10/2003 | Chatsinchai et al. | |
| 2003/0203734 A1 | 10/2003 | Igloi et al. | |
| 2003/0233178 A1 | 12/2003 | Sinex | |
| 2004/0049609 A1 | 3/2004 | Simonson et al. | |
| 2004/0106404 A1 | 6/2004 | Gould et al. | |
| 2004/0128326 A1 | 7/2004 | LeCrone et al. | |
| 2004/0243994 A1 | 12/2004 | Nasu | |
| 2005/0065670 A1 | 3/2005 | Tripmaker | |
| 2005/0235340 A1 | 10/2005 | To | |
| 2005/0240555 A1 | 10/2005 | Wilde et al. | |
| 2005/0273662 A1 * | 12/2005 | Yi | 714/31 |
| 2005/0286452 A1 | 12/2005 | Hardgrave et al. | |
| 2006/0156053 A1 | 7/2006 | Judd et al. | |
| 2006/0164261 A1 | 7/2006 | Stiffler | |
| 2006/0229772 A1 | 10/2006 | McClary | |
| 2006/0229777 A1 | 10/2006 | Hudson et al. | |
| 2006/0233178 A1 | 10/2006 | Lu et al. | |
| 2006/0245431 A1 | 11/2006 | Morris | |
| 2006/0265110 A1 | 11/2006 | Ferro et al. | |
| 2006/0284050 A1 | 12/2006 | Busse et al. | |
| 2007/0010923 A1 * | 1/2007 | Rouyre | 701/29 |
| 2007/0027589 A1 | 2/2007 | Brinkley et al. | |
| 2007/0114280 A1 | 5/2007 | Coop et al. | |
| 2007/0183435 A1 | 8/2007 | Kettering et al. | |
| 2007/0198513 A1 | 8/2007 | Stelling et al. | |
| 2007/0279244 A1 | 12/2007 | Haughawout et al. | |
| 2007/0298786 A1 * | 12/2007 | Meyers et al. | 455/431 |
| 2008/0094615 A1 * | 4/2008 | Harres | 356/73.1 |
| 2008/0104686 A1 | 5/2008 | Erickson | |
| 2008/0140278 A1 | 6/2008 | Breed | |
| 2008/0208853 A1 | 8/2008 | Vismans et al. | |
| 2008/0245431 A1 | 10/2008 | Janich et al. | |
| 2009/0024312 A1 | 1/2009 | Brinkman | |
| 2009/0112873 A1 | 4/2009 | Nanjangud Bhaskar et al. | |
| 2009/0138385 A1 | 5/2009 | Harnish et al. | |
| 2009/0138516 A1 | 5/2009 | Young et al. | |
| 2009/0138517 A1 | 5/2009 | McLain et al. | |
| 2009/0138518 A1 | 5/2009 | Rodgers et al. | |
| 2009/0138871 A1 | 5/2009 | Kimberly et al. | |
| 2009/0138872 A1 | 5/2009 | Fuchs et al. | |
| 2009/0138873 A1 | 5/2009 | Beck et al. | |
| 2009/0138874 A1 | 5/2009 | Beck et al. | |

FOREIGN PATENT DOCUMENTS

| | | | |
|---|---|---|---|
| DE | 102006019972 A1 | 11/2007 | |
| EP | 1426870 A2 | 11/2003 | |
| EP | 1840755 A2 | 11/2003 | |
| EP | 1426870 A | 6/2004 | |
| EP | 1840755 A | 10/2007 | |
| EP | 2012236 A2 | 6/2008 | |
| EP | 2012236 A | 1/2009 | |
| GB | 2327788 A | 2/1999 | |
| GB | 2389910 A | 12/2003 | |
| WO | 02065683 A | 8/2002 | |
| WO | WO02065683 A2 | 8/2002 | |
| WO | 2009070655 | 6/2009 | |
| WO | 2009082592 | 7/2009 | |
| WO | WO2009097554 A1 | 8/2009 | |

OTHER PUBLICATIONS

EP office action dated Jun. 12, 2011 regarding Application 09 706 455.4-2221 (Ref. NAM/P114012EP00), 5 Pages.

PCT search report dated Jan. 30, 2008 regarding Application PCT/US2009032686, 5 Pages.

USPTO Office Action dated Nov. 16, 2011 for U.S. Appl. No. 12/277,174, 45 pages.

Response to Office Action dated Feb. 16, 2012 for U.S. Appl. No. 12/277,174, 8 pages.

Appeal Brief filed Apr. 11, 2012 for U.S. Appl. No. 12/277,182, 32 pages.

Uspto Examiner's Answer to Appeal Brief dated Jun. 14, 2012 for U.S. Appl. No. 12/277,182, 22 pages.

USPTO Final Office Action dated Jan. 11, 2012 for U.S. Appl. No. 12/277,182, 22 pages.

USPTO Office Action dated Mar. 9, 2011 for U.S. Appl. No. 12/277,182, 24 pages.

USPTO Office Action dated Aug. 16, 2011 for U.S. Appl. No. 12/277,182, 26 pages.

USPTO Office Action dated Jun. 8, 2012 for U.S. Appl. No. 12/276,516, 30 pages.

USPTO Office Action dated Apr. 18, 2012 for U.S. Appl. No. 12/276,549, 33 pages.

Appeal Brief filed Feb. 2, 2012 for U.S. Appl. No. 12/276,577, 36 pages.

USPTO Examiner's Answer to Appeal Brief dated Mar. 30, 2012 for U.S. Appl. No. 12/276,577, 22 pages.

Reply Brief filed May 30, 2012 for U.S. Appl. No. 12/276,577, 14 pages.

USPTO Final Office Action dated Aug. 17, 2011 for U.S. Appl. No. 12/276,577, 16 pages.

USPTO Office Action dated Apr. 21, 2011 for U.S. Appl. No. 12/276,577, 26 pages.

USPTO Office Action dated Mar. 17, 2011 for U.S. Appl. No. 12/276,587, 18 pages.

USPTO Notice of Allowance dated Jan. 24, 2012 for U.S. Appl. No. 12/276,587, 10 pages.

USPTO Notice of Allowance dated Oct. 3, 2011 for U.S. Appl. No. 12/276,587, 16 pages.

USPTO Office Action dated Jun. 24, 2011 for U.S. Appl. No. 12/275,651, 16 pages.

USPTO Notice of Allowance dated Dec. 29, 2011 for U.S. Appl. No. 12/275,651, 15 pages.

USPTO Final Office Action dated Jun. 20, 2011 for U.S. Appl. No. 12/276,728, 36 pages.

USPTO Office Action dated Jan. 26, 2011 for U.S. Appl. No. 12/276,728, 32 pages.

Adelsbach et al., "Embedding Trust into Cars—Secure Software Delivery and Installation", Oct. 2005, 15 pages.

Sampigethaya et al., "Information Management System for Ground Vehicles", U.S. Appl. No. 12/857,740 filed Aug. 17, 2010, 74 pages.

De Boer et al., "Generic Remote Software Update for Vehicle ECUs Using a Telematics Device as a Gateway", Networked Vehicle, Advanced Microsystems for Automotive Applications 2005, May 2005, pp. 371-380.

PCT Search Report dated Jan. 26, 2009 regarding international application No. PCT/US08/84824, applicant's reference PCT, applicant The Boeing Company, 2 pages.

PCT Search Report dated May 22, 2009 regarding international application No. PCT/US08/84839, applicant's reference 07-0698PCT, applicant The Boeing Company, 3 pages.

* cited by examiner

AIRCRAFT MAINTENANCE LAPTOP

RELATED PROVISIONAL APPLICATION

The present invention is related to and claims the benefit of priority of provisional U.S. patent application Ser. No. 61/024,756 entitled "Aircraft Maintenance Laptop", filed on Jan. 30, 2008, which is hereby incorporated by reference.

BACKGROUND INFORMATION

1. Field

The present disclosure relates generally to an improved data processing system and in particular to a method and apparatus for processing data. Still more particularly, the present disclosure relates to a computer implemented method, apparatus, and computer usable program code for performing maintenance on an aircraft.

2. Background

Modern aircraft are extremely complex. For example, an aircraft may have many types of electronic systems on board. A particular component within an electronic system on an aircraft may also be referred to as a line replaceable unit (LRU). Each line replaceable unit may further take on various forms. A line replaceable unit may be, for example, without limitation, a component of a flight management system, an autopilot, an in-flight entertainment system, a communications system, a navigation system, a flight controller, a flight recorder, and a collision avoidance system. An aircraft also has various complex electrical wiring, mechanical, and hydraulic systems. These types of systems may be controlled by line replaceable units.

Personnel, such as aircraft maintenance technicians and line maintenance mechanics may perform various maintenance activities on an aircraft. These activities may include, for example, monitoring systems, diagnosing problems, troubleshooting issues, preparing failed or damaged items, or other suitable maintenance activities.

Currently, maintenance personnel employ a multitude of different tools in performing maintenance on different systems within an aircraft. The number of tools and the cost of the tools may increase the cost for maintaining aircraft.

Therefore, it would be advantageous to have a method and apparatus that overcomes the problems described above.

SUMMARY

In one advantageous embodiment, an apparatus comprises a portable computer and program code stored on the portable computer. The program code is capable of being executed to establish a communications link with an aircraft network data processing system in an aircraft, obtain information about the aircraft over the communications link, display the information on a display device for the portable computer, receive user input to control a data processing system on the aircraft network data processing system in the aircraft, and send a number of commands to the data processing system in response to receiving the user input.

In another advantageous embodiment, an apparatus for performing maintenance operations on an aircraft comprises a health and fault information process, an aircraft system information process, an aircraft support information access process, a flight control rigging process, a circuit breaker and contactor process, and a laptop computer. The health and fault information process is capable of accessing health and fault information on the aircraft. The aircraft system information process is capable of accessing status information for the aircraft. The aircraft support information access process is capable of accessing support information for the aircraft. The flight control rigging process is capable of rigging flight control surfaces on the aircraft. The circuit breaker and contactor process is capable of obtaining and manipulating a state of circuit breakers and contactors on the aircraft. The laptop computer is capable of establishing a wireless communications link with an aircraft network data processing system located within a selected distance of the laptop computer. The health and fault information process, the aircraft support information access process, the aircraft system information process, the flight control rigging process, and the circuit breaker and contactor process execute on the laptop computer.

In yet another advantageous embodiment, a method is present for performing maintenance operations. A communications links is established with an aircraft network data processing system in an aircraft using a portable computer. Information is received at the portable computer about the aircraft from the aircraft network data processing system. A number of data processing systems in the aircraft are controlled using the portable computer to perform a maintenance operation.

In still yet another advantageous embodiment, a computer program product for performing maintenance operations comprises a computer recordable storage medium and program code stored on the computer recordable storage medium. Program code is present for establishing a communications link with an aircraft network data processing system in an aircraft using a portable computer. Program code is also present for receiving information at the portable computer about the aircraft from the aircraft network data processing system. Further, program code is present for controlling a number of data processing systems in the aircraft using the portable computer to perform a maintenance operation.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
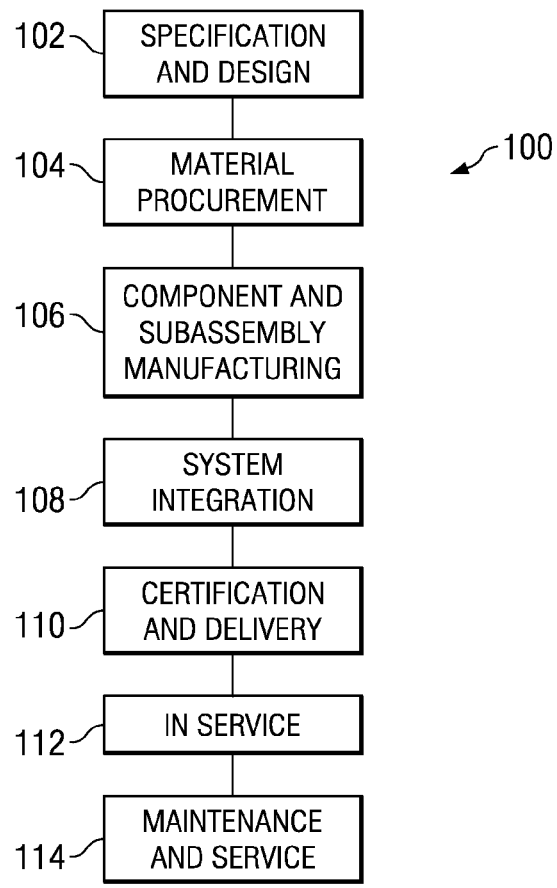
FIG. 1 is a diagram of an aircraft manufacturing and service method in which an advantageous embodiment may be implemented.
Figure 2:
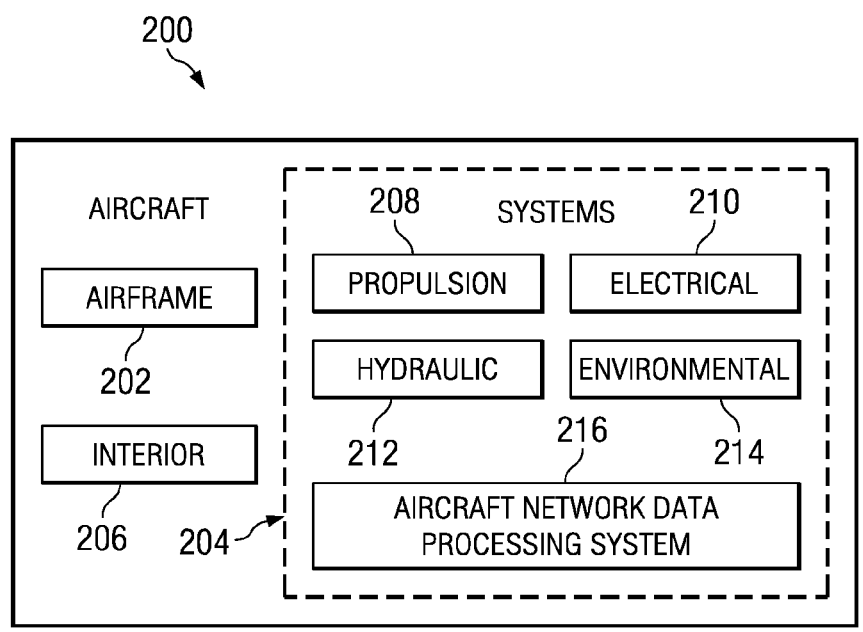
FIG. 2 is a block diagram of an aircraft in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

The different advantageous embodiments may be implemented during portions of aircraft manufacturing and service method 100 when maintenance operations are required. A maintenance operation is any operation, process, or procedure that is performed to maintain an aircraft. A maintenance operation may include, for example, monitoring systems, diagnosing problems or detected faults, troubleshooting problems, repairing damaged parts, replacing parts, and other suitable operations.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a block diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214, and aircraft network data processing system 216. Any number of other systems may be included. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, one or more of apparatus embodiments, method embodiments, or a combination thereof may be utilized while aircraft 200 is in service 112 or during maintenance and service 114 in FIG. 1.

The different advantageous embodiments recognize that with aircraft network data processing system 216 being located on aircraft 200, that currently maintenance mechanics or other maintenance personnel may access information about the aircraft from a limited number of locations. For example, aircraft system health and fault information is currently available from a maintenance access terminal located on the flight deck. Accessing this terminal typically requires the flight crew to vacate or leave the flight deck for maintenance operations to occur. Another option that may be used is a portable maintenance access terminal, which is located in the electronics bay of the aircraft. This type of terminal is a high cost option in an aircraft.

As a result, many aircraft only include a maintenance access terminal and not a portable maintenance access terminal. The portable maintenance access terminal (PMAT) has some limited ability to be removed from the electronics bay and can in turn be plugged into or physically connected to a limited number of other locations around the aircraft in order to perform maintenance. These locations are limited to the engines and the auxiliary power unit.

Industry experience has shown that the functional limitations of the portable maintenance access terminal, combined with its limited mobility, have resulted in it seldom if ever being used outside of the stowage position in the electronics bay. Also, the limited functionality of the device results in a need to visit the flight deck to perform other related maintenance actions, limiting the benefit of its portability. As a result, the different advantageous embodiments recognize that in currently available aircraft, limited access constrains and prolongs the maintenance operations performed by maintenance mechanics.

Further, these types of maintenance operations also may cause disruptions on the flight deck that inhibit or slow down other work that could otherwise be performed concurrently. The different advantageous embodiments recognize that these limitations may lead to delays for maintenance performed between flights.

Thus, the different advantageous embodiments provide a computer implemented method, apparatus, and computer usable program code for a portable data processing system to communicate with the aircraft network data processing system. The different advantageous embodiments also allow the portable data processing system to control various components within the aircraft as well as access information needed for maintenance operations.

In one advantageous embodiment, an apparatus comprises a portable computer and program code stored on the portable computer. The program code is capable of being executed by the portable computer to establish a communications link with an aircraft network data processing system in an aircraft, obtain information about the aircraft over the communications link, display the information on a display device for the portable computer, receive user input to control a data processing system on the aircraft network data processing system in the aircraft, and send a number of commands to the data processing system.

In one or more of the different advantageous embodiments, the control and access is performed through a wired and/or wireless connection in which the operator of the portable data processing system may access aircraft systems information from various locations on board or within a specified radius around the aircraft. As a result, an operator may perform maintenance operations and access necessary aircraft information without leaving the work area. In other words, the different advantageous embodiments provide an ability for an operator to read the aircraft system health and fault information from almost any location within some radius or distance from or in the aircraft.

The advantageous embodiments provide a computer implemented method, apparatus, and computer program code for performing maintenance operations on an aircraft. As described above, the advantageous embodiments may include one or more features including an ability for a mechanic to view aircraft system health and fault information from any location where maintenance work is performed on the aircraft; an ability for the mechanic to view aircraft system information and manipulate specific aircraft systems from any location where maintenance work may be performed on the aircraft; an ability to integrate fault data with aircraft support information; ability to indicate and/or manipulate circuit breaker and contactor status on the aircraft; an ability to control rigging of the aircraft; and an ability to integrate the different features of all the above features, along with existing maintenance system functionalities into one portable computer tool.

Figure 3:
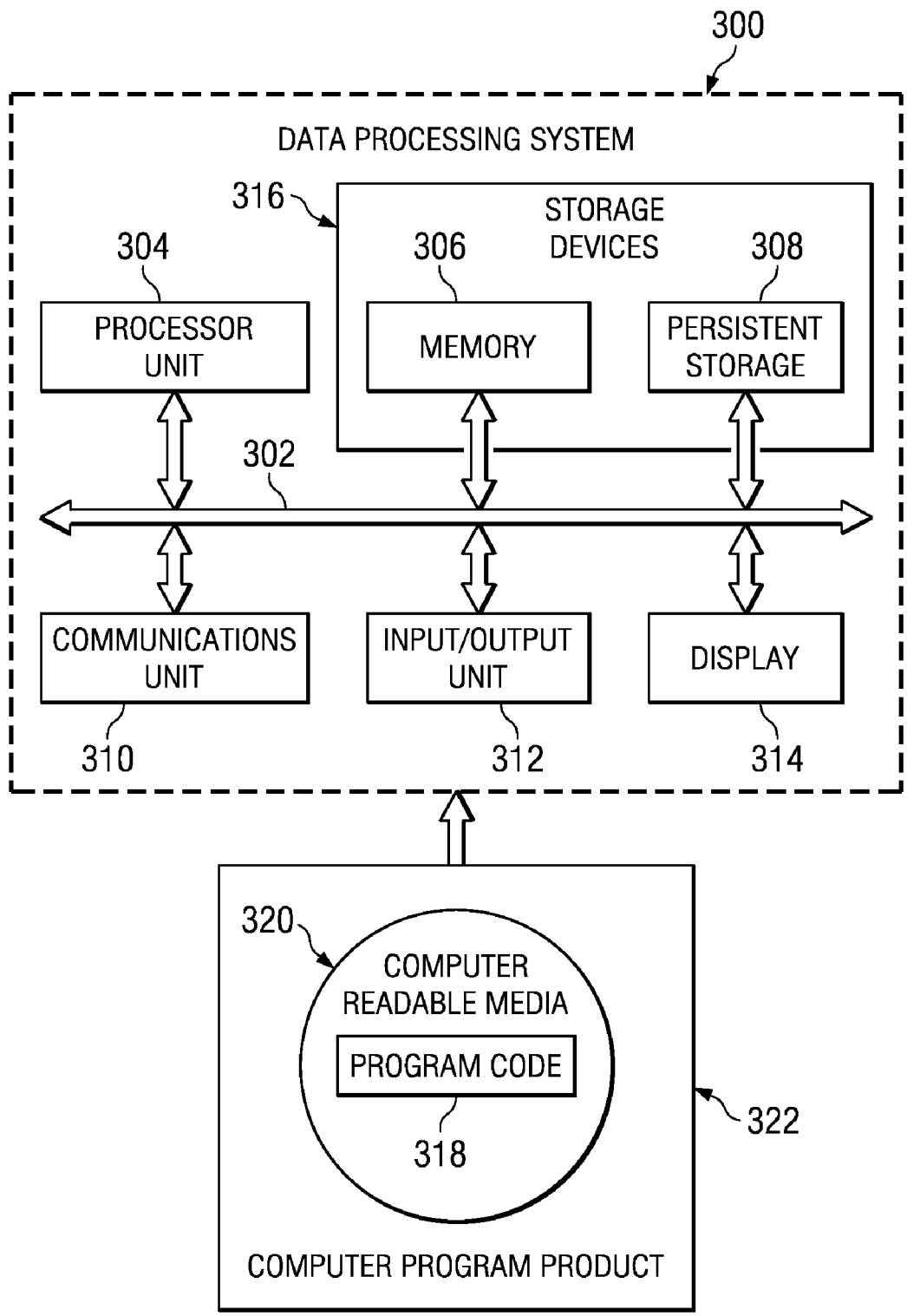
FIG. 3 is a diagram of a data processing system in accordance with an advantageous embodiment.

Turning now to FIG. 3, a diagram of a data processing system is depicted in accordance with an advantageous embodiment. Data processing system 300 is a hardware device and is an example of a data processing system that may be used in aircraft 200 in FIG. 2. Data processing system 300 may be used to implement computers, portable computers, laptop computers, line replaceable units and other suitable devices. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example, without limitation, data, program code in functional form, and/or other suitable information either on a temporary basis and/or a permanent basis. Memory 306, in these examples, may be, for example, a random access memory or any other suitable volatile or non-volatile storage device.

Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications, and/or programs may be located in storage devices 316, which are in communication with processor unit 304 through communications fabric 302. In these illustrative examples, the instructions are in a functional form on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 318 is located in a functional form on computer readable media 320 that is selectively removable and may be loaded onto or transferred to data processing system 300 for execution by processor unit 304. Program code 318 and computer readable media 320 form computer program product 322 in these examples. In one example, computer readable media 320 may be in a tangible form, such as, for example, an optical or magnetic disc that is inserted or placed into a drive or other device that is part of persistent storage 308 for transfer onto a storage device, such as a hard drive that is part of persistent storage 308.

In a tangible form, computer readable media 320 also may take the form of a persistent storage, such as a hard drive, a thumb drive, or a flash memory that is connected to data processing system 300. The tangible form of computer readable media 320 is also referred to as computer recordable storage media. In some instances, computer readable media 320 may not be removable.

Alternatively, program code 318 may be transferred to data processing system 300 from computer readable media 320 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 318 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 300 is any hardware apparatus that may store data. Memory 306, persistent storage 308 and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

Figure 4:
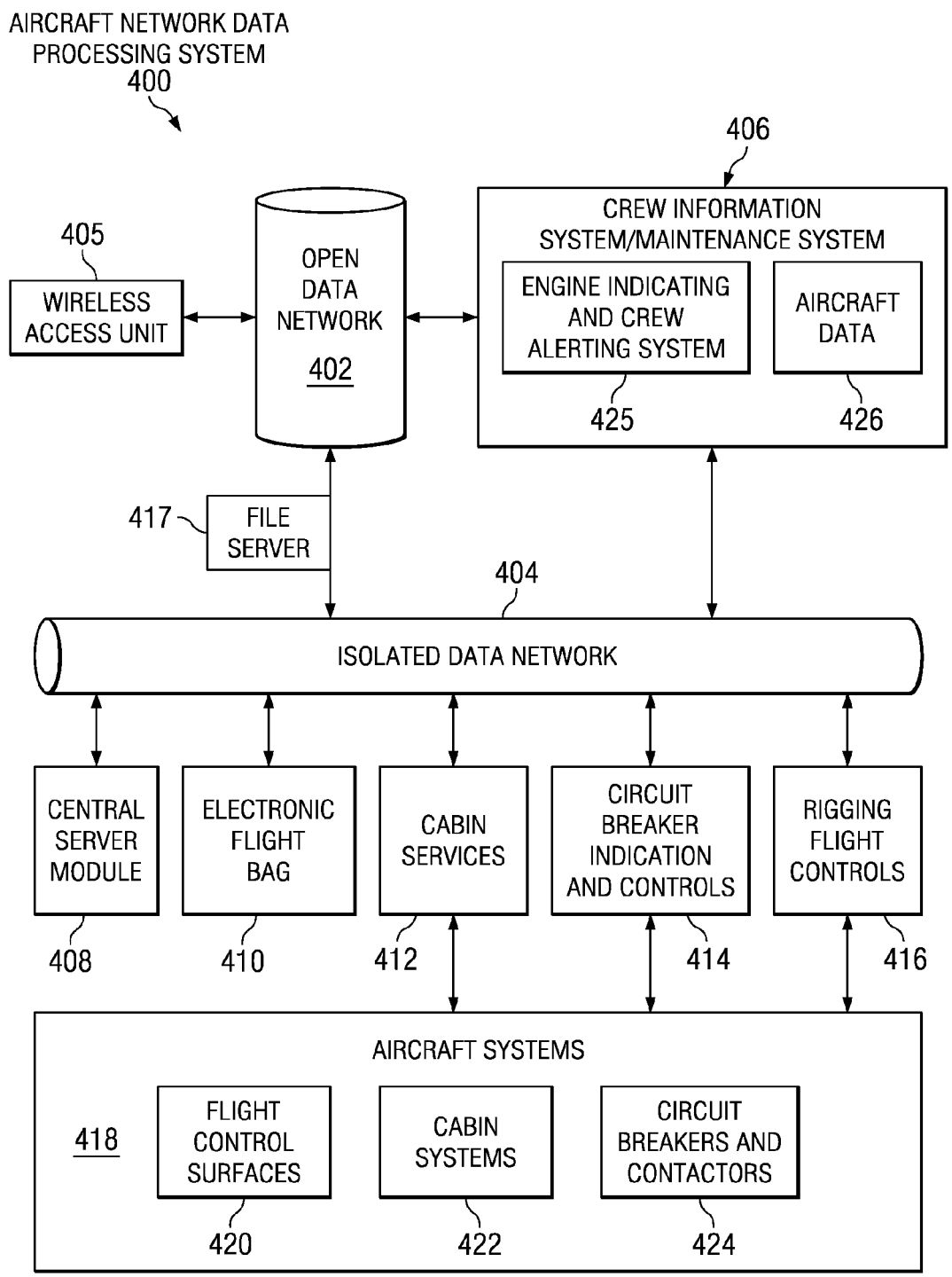
FIG. 4 is a diagram of an aircraft network data processing system in accordance with an advantageous embodiment.

Turning now to FIG. 4, a diagram of an aircraft network data processing system is depicted in accordance with an advantageous embodiment. Aircraft network data processing system 400 is a more detailed example of aircraft network data processing system 216 in FIG. 2. The different data processing systems and line replaceable units within aircraft network data processing system 400 may be implemented using a data processing system, such as data processing system 300 in FIG. 3.

In this example, aircraft network data processing system 400 includes two networks, open data network 402 and isolated data network 404. The computers, line replaceable units, and/or other devices in aircraft network data processing system 400 may be implemented using aircraft network data processing system 400 in FIG. 4. These two networks may include physical links, such as wired and optical links. Additionally, in some implementations, wireless links also may be present.

Open data network 402 allows data processing systems or devices outside of aircraft network data processing system 400 to access aircraft network data processing system 400. In this depicted example, wireless access unit 405 and crew information system/maintenance system 406 connect to open data network 402. In these examples, wireless access unit 405 provides an ability to access various systems within aircraft network data processing system 400. This access, of course, may be controlled by central server module 408 to present unauthorized access to various data processing systems within aircraft network data processing system 400.

Isolated data network 404 only provides access to internal data processing systems, such as crew information system/maintenance system 406 and line replaceable units, such as central server module 408, electronic flight bag 410, cabin services 412, circuit breaker indication and controls 414, rigging flight controls 416, and file server 417.

One or more of these line replaceable units can be used to control aircraft systems 418. Aircraft systems 418 is any collection of electronic devices, computers, line replaceable units, mechanical components, hydraulic components, structures, and/or other devices that can be directly or indirectly controlled and/or accessed by a line replaceable unit. In these illustrative examples, aircraft systems 418 include flight control surfaces 420, cabin systems 422, and circuit breakers and contactors 424.

In these examples, a line replaceable unit is an electronic system on an aircraft and may take various forms other than those illustrated here. For example, line replaceable units also include a flight management system, an in-flight entertainment system, a navigation system, a flight controller, a flight recorder, and a collision avoidance system. Line replaceable units may use software or other programming to provide the logic or control for various operations and functions on the aircraft.

In these examples, central server module 408 is an example of a line replaceable unit that provides common networking functions for different networks within aircraft network data processing system 400. For example, central server module 408 may provide packet routing, firewall services, and wireless access.

Electronic flight bag 410 is an electronic information management device that aids the flight crew in performing flight management tasks more efficiently with less paper. In these illustrative examples, electronic flight bag 410 is portable and removable from the aircraft in which aircraft network data processing system 400 is located. Electronic flight bag 410 may display aviation data or perform calculations.

Cabin services 412 is a line replaceable unit that provides a capability to control cabin systems 422 in the aircraft. Cabin systems 422 may include components, such as, for example, lighting, cabin doors, and a public address system. Circuit breaker indication and controls 414 may provide an identification of the state of various circuit breakers and contactors within circuit breakers and contactors 424 in the aircraft. The state information may be, for example, open, closed, and collared.

Circuit breakers and contactors 424 are spread throughout the aircraft. This line replaceable unit provides an ability to see the state of all circuit breakers and contactors 424 on the aircraft. With few exceptions, such as high current, thermal circuit breakers may not be visible from the system. Further, circuit breaker indication and controls 414 also may be used to change the state of the different circuit breakers and contactors in circuit breakers and contactors 424.

Rigging flight controls 416 is another line replaceable unit, in these illustrative examples, that provides a capability for rigging or manipulating flight control surfaces 420 on the aircraft. Rigging of flight control surfaces 420 requires physical positioning of the surfaces to preset locations and establish null values which are stored in-flight control computers. Rigging flight controls 416 controls these manipulations to physically position flight control surfaces 420. Rigging flight controls 416 controls actuators and other mechanisms connected or coupled to the control surfaces.

Crew information system/maintenance system 406 is a data processing system that includes numerous functions and components. Examples of these are engine indicating and crew alerting system 425 and aircraft data 426. Engine indicating and crew alerting system 425 provides information about the aircraft that is typically available only from flight deck displays in the cockpit.

Engine indicating and crew alerting system 425 is a line replaceable unit that provides access to maintenance pages and systems and synoptic system pages, such as those found in aircraft data 426. These pages include, for example, aircraft information, such as the position of valves, fluid quantities on board, electrical bus configurations, tire pressures, and other suitable information that may be needed for maintenance operations. This information is typically accessed by mechanics during routine and unscheduled maintenance and troubleshooting activities. File server 417 may store data files, logs, documents, manuals, and/or programs in the aircraft.

The illustration of aircraft network data processing system 400 in FIG. 4 is not meant to imply physical or architectural limitations on the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
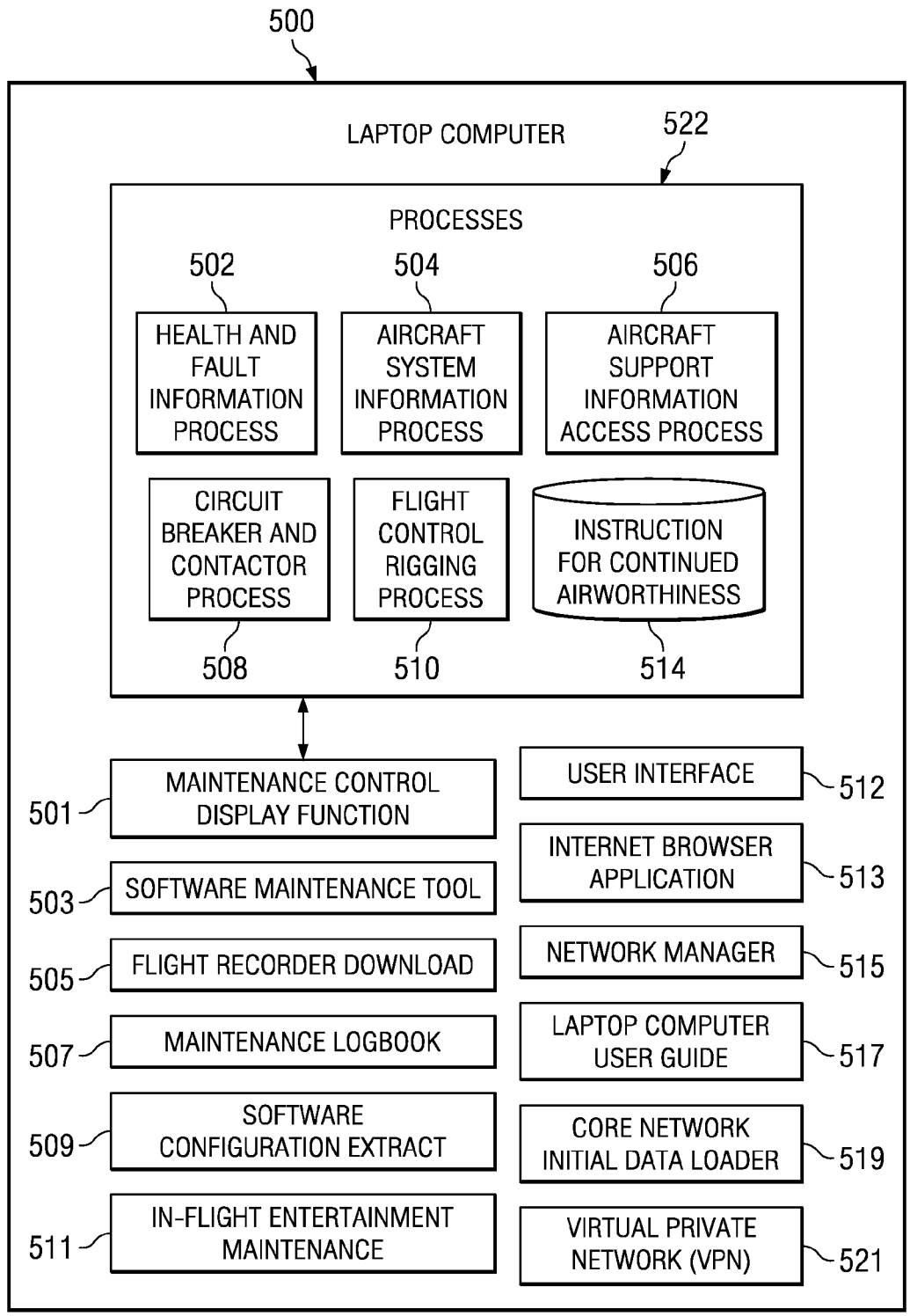
FIG. 5 is a functional block diagram of a laptop computer in accordance with an advantageous embodiment.

Turning now to FIG. 5, a functional block diagram of a laptop computer is depicted in accordance with an advantageous embodiment. In this example, laptop computer 500 is an example of a portable computer that can be implemented using data processing system 300 in FIG. 3. Of course, any portable computer can be used in the different advantageous embodiments. A portable computer is any data processing system that is designed to be moved from one location to another location.

A portable computer typically includes a display and an input device. The input device may be, for example, a touch screen, a keyboard, a touch pad, and/or some other suitable device. Other illustrative examples of portable computers include, for example, a pocket computer, a personal digital assistant, a smartphone and/or some other suitable device.

In these illustrative examples, laptop computer 500 provides a capability to communicate information with an aircraft network data processing system in an aircraft. The information may be, for example, without limitation, data, commands, programs, logs from onboard maintenance systems of an aircraft, supporting maintenance information, and/or other suitable systems and/or functions used to operate an aircraft.

In these illustrative examples, laptop computer 500 provides a capability to access information and control various systems in an aircraft. Further, laptop computer 500 may be used to transport software to and from an aircraft.

Laptop computer 500 is capable of accessing and controlling various systems within aircraft network data processing system 400 in FIG. 4 through a wired connection or a wireless communications link established with wireless access unit 405 in FIG. 4 in these examples. Laptop computer 500 is capable of executing a number of applications through the desktop of laptop computer 500. A number used with reference to an item means one or more items. For example, a number of applications may be one or more applications.

Laptop computer 500 is capable of implementing applications such as, for example, without limitation, maintenance control display function 501, software maintenance tool 503, flight recorder download 505, maintenance logbook 507, software configuration extract 509, in-flight entertainment maintenance (IFE) 511, internet browser application 513, network manager 515, laptop computer user guide 517, core network initial data loader 519, virtual private network (VPN) 521, and/or other suitable applications. These applications are examples of software programs capable of executing on laptop computer 500 independent of a connection to an aircraft.

In these illustrative examples, maintenance logbook 507 is an example of an application that provides a capability to store, monitor, and/or maintain an electronic logbook. This logbook contains fault data and maintenance operations performed on the aircraft in these illustrative examples. Core network initial data loader 519 is an application that transports software from the aircraft to laptop computer 500 through the aircraft network. Network manager 515 and virtual private network (VPN) 521 are applications used to establish a wired and/or wireless connection from laptop computer 500 to the aircraft.

In these examples, maintenance control display function 501 is an application displayed on the desktop of laptop computer 500 using user interface 512. In these examples, user interface 512 may be an interface, such as, for example, Windows Explorer, or some other suitable user interface.

Maintenance control display function 501 is an interface used to operate functions provided by processes 522. Processes 522 include, in this example, at least one of health and fault information process 502, aircraft system information process 504, aircraft support information access process 506, circuit breaker and contactor process 508, flight control rigging process 510, instruction for continued airworthiness 514, and/or other suitable applications or programs.

As used herein, the phrase "at least one of", when used with a list of items, means that different combinations of one or more of the items may be used and only one of each item in the list may be needed. For example, "at least one of item A, item B, and item C" may include, for example, without limitation, item A, or item A and item B. This example also may include item A, item B, and item C, or item B and item C.

Health and fault information process 502 provides a capability for an operator of laptop computer 500 to view aircraft system health and fault information. This information may be obtained through a communications link to aircraft network data processing system 400 in FIG. 4 to communicate with crew information system/maintenance system 406 in FIG. 4. Aircraft system information process 504 allows a user to view aircraft status information that is currently available only from the flight deck displays in the cockpit. This information, accessed by aircraft system information process 504, may be obtained from crew information system/maintenance system 406 in FIG. 4.

In particular, aircraft system information process 504 may allow communication with engine indicating and crew alerting system 425 in FIG. 4 as well as accessing aircraft data 426 in FIG. 4. In this manner, remote access of this information allows an operator performing maintenance operations to access the information without entering the flight deck of the aircraft and displacing other crew members between flights.

With aircraft system information process 504, an operator of laptop computer 500 may have control for specific tests or to configure the aircraft for maintenance operations. This component may display aircraft systems information and/or manipulate aircraft systems from outside of the flight deck though user interface 512.

Aircraft support information access process 506 provides access support information. Support information is any information that may be used in providing maintenance operations. This information may be found in instruction for continued airworthiness 514. Access to this information is a regulatory requirement for performing maintenance on an aircraft. Instruction for continued airworthiness 514 includes documents, such as, for example, without limitation, aircraft maintenance manuals, equipment lists, and illustrative parts catalogs.

Additionally, other data sources also may be used and found within instruction for continued airworthiness 514 in addition to those required by regulatory requirements. These other sources include, fault isolation manuals, aircraft and maintenance logbooks, and other suitable information. This information may be displayed in conjunction with health information, status information, and/or other suitable information about the aircraft. Thus, this component provides for integration of aircraft systems information with relevant support instructions.

The different advantageous embodiments place this information on laptop computer 500 rather than off-site as currently stored. A maintenance operator may currently need to look at paper copies for this type of information. The different advantageous embodiments provide this information within laptop computer 500. In other advantageous embodiments, this information may be accessible by laptop computer 500 at the maintenance facility or airport at the remote data processing system through the wireless communications links that laptop computer 500 may establish.

Further, aircraft support information access process 506 also may access aircraft data on the aircraft, such as, aircraft data 426 in FIG. 4. This aircraft data may include, for example, log books or other information needed for maintenance operations. This data may be accessed at the same time the mechanic accesses the aircraft systems information to allow for concurrent viewing of the aircraft fault information and maintenance instructions to resolve the fault.

Additionally, this component is capable of integrating information about the aircraft with support information. In other words, this component may display status information about the aircraft with support information for the aircraft. The support information displayed may relate to the status information. This support information may provide, for example, data about parts, procedures, configurations, tests, and other information relating to the status information.

The information about the aircraft may be obtained through health and fault information process 502 and aircraft system information process 504. The integration of information may occur through dynamically generated links formed between the aircraft generated system fault information and appropriate maintenance data as well as the necessary ground tests to confirm the repairs.

This linking of the aircraft information to support information as well as linking all the information resources available at a single location, increases the efficiency of maintenance operations. In these examples, the linking takes the form of hyperlinks directly from the maintenance messages displayed from the aircraft to the supporting fault isolation manual or between different but related support information.

Circuit breaker and contactor process 508 allows an operator of laptop computer 500 to control and manipulate the state of circuit breakers and contactors on the aircraft. A contactor is a high energy, remote controlled switch. A contactor is often used for controlling where main aircraft power is routed in an aircraft. This process may interface or communicate with circuit breaker indication and controls 414 in FIG. 4. Thus, this component provides for displaying and manipulating circuit breakers and contactors in an aircraft.

Flight control rigging process 510 allows a user to adjust the physical position of flight control surfaces as well as establish values for storage in the flight control computing systems. Flight control rigging process 510 may perform these operations by communicating with rigging flight controls 416 in FIG. 4.

Currently, rigging of flight control surfaces without the different advantageous embodiments may require multiple mechanics to coordinate activities between the flight deck and the flight control surface being rigged. This process may require physical disassembly and adjustment of components in the mechanical elements of the flight control systems. With the use of rigging flight controls 416 in FIG. 4 and flight control rigging process 510, this functionality may be performed remotely by a single maintenance operator using laptop computer 500.

User interface 512 provides the user an ability to see the information accessed by the different components within laptop computer 500 as well as provide user input to manipulate and change various line replaceable units or other data processing systems within an aircraft. In this manner, user interface 512 allows a user to see and control various components in the aircraft.

The currently available systems involve the use of a maintenance access terminal which has limited access to aircraft information, such as fault information, condition monitoring information, data loading, and ground test interface. User interface 512 provides additional capabilities needed from maintenance operations to access interface with other aircraft systems, such as other data processing systems and line replaceable units. The systems include, for example, multifunction displays, circuit breakers, system configuration controls, and other suitable systems.

In this manner, an operator does not need to access the different areas of the aircraft. User interface 512 allows for the different features to be integrated with each other as well as with existing maintenance features.

Instead, the operator may perform these functions at laptop computer 500. Further, user interface 512 allows an integration of displays from various systems being accessed and controlled rather than losing previous displayed information as in currently available systems.

For example, aircraft support information access process 506 may display various schematics or diagrams or instructions from instruction for continued airworthiness 514 while viewing information about the aircraft through health and fault information process 502 and/or aircraft system information process 504. Maintenance often requires specific settings be applied to aircraft systems as a part of the maintenance process. Generally, these controls are in the flight deck.

In using laptop computer 500 and maintenance control display function 501, many of these features can now be controlled remotely and without forcing the maintenance person to leave the work area. Also, laptop computer 500 may host many applications that can be accessed simultaneously if necessary. Thus, giving the operator maximum access to several features of choice at the same time.

In this manner, different features and functions used in performing maintenance operations that currently require the maintenance technician to be in one location in the aircraft to see information and in another location to perform tests, repairs, and or other maintenance operations may be performed in a single location. This location may be anywhere inside or outside of the aircraft where a wireless communications link can be established between a portable data processing system, such as a laptop computer, configured with software for the different functionalities and an aircraft network data processing system in the aircraft.

Further, laptop computer 500 also may be used to transport and load software aircraft parts onto an aircraft network data processing system. This process currently requires physical media, such as floppy disks and CD-ROMs, for transport to the aircraft. Conventional data loading also requires an onboard data loading unit, as well as a disk or CD drive to be installed in the aircraft or a portable data loader which can be carried to the aircraft. Laptop computer 500 replaces all of these items. System configuration also may be performed or maintained using the different advantageous embodiments.

Thus, with the different advantageous embodiments, maintenance personnel are not confined to a particular area of the aircraft to access and view data. The personnel can view and access data where the work takes place using different advantageous embodiments. Further, interrupts in the work of the flight crew do not occur because the maintenance person does not have to enter the flight deck of the cockpit. One result, with some advantageous embodiments, is that less time is needed to get the aircraft ready between flights.

The illustration of laptop computer 500 in FIG. 5 is not meant to imply physical or architectural limitations on the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, laptop computer 500 may include other applications other than the ones presented. In other illustrative examples, maintenance control display function 501 may include processes in addition to the processes illustrated. In yet other examples, maintenance control display function 501 may not include flight control rigging process 510. Still further, laptop computer 500 may include a second user interface in addition to user interface 512 allowing the operator to choose which user interface is used.

Figure 6:
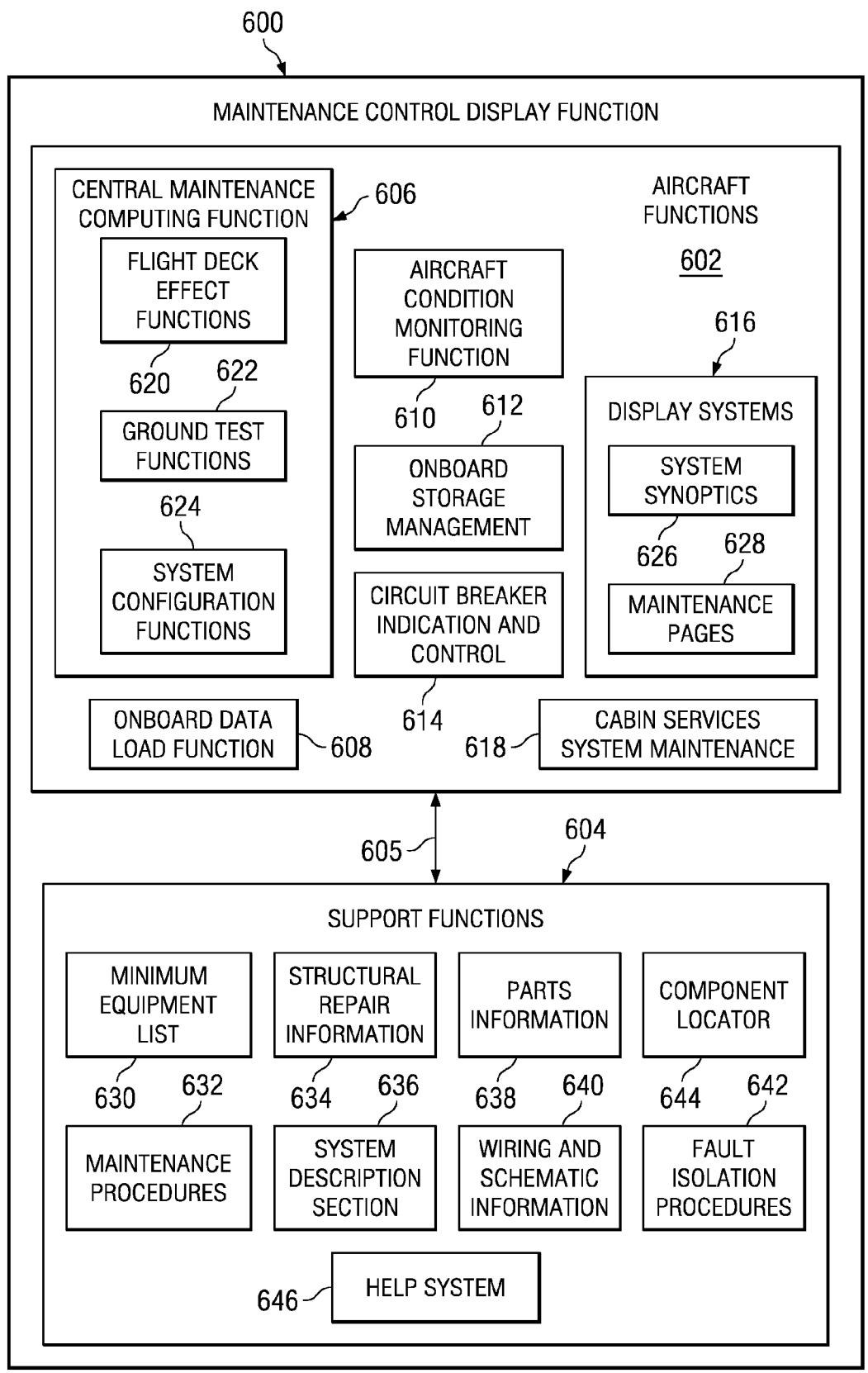
FIG. 6 is a block diagram of a maintenance control display function in accordance with an advantageous embodiment.

With reference now to FIG. 6, a block diagram of a maintenance control display function is depicted in accordance with an advantageous embodiment. Maintenance control display function 600 is an example of a maintenance control display function such as, for example, maintenance control display function 501 for laptop computer 500 in FIG. 5.

In these illustrative examples, maintenance control display function 600 is used in these examples as a tool for diagnosing, repairing, testing, and/or resolving issues for aircraft systems. Maintenance control display function 600 allows access and control of aircraft functions 602 and support functions 604. In these examples, information about aircraft functions 602 is provided by health and fault information process 502 in FIG. 5. Information about support functions 604 is provided by aircraft support information access process 506 in FIG. 5, in this illustrative example.

Aircraft functions 602 include, without limitation, central maintenance computing function 606, onboard data load function 608, aircraft condition monitoring function 610, onboard storage management 612, circuit breaker indication and control 614, display systems 616, and cabin services system maintenance 618.

Central maintenance computing function 606 provides several functions such as, for example, flight deck effect functions 620, ground test functions 622, and system configuration functions 624. Flight deck effect functions 620 are used to compile and/or analyze aircraft system faults and correlate these faults to defined system faults. A flight deck effect is the fault or discrepancy that has occurred in one or more of the aircraft systems. Ground test functions 622 may perform specific tests for an aircraft during verification of maintenance procedures. System configuration functions 624 may provide access to the configuration of an aircraft's maintenance systems.

In these illustrative examples, onboard data load function 608 allows an ability to install software onto an aircraft for the aircraft's systems and components. Aircraft condition monitoring function 610 allows access to selected aircraft system data for the purpose of monitoring, collecting, and reporting such data under selected parameters, rates, and/or conditions. Onboard storage management 612 provides a function to view, store, and/or delete data files stored on the file server of an aircraft. Circuit breaker indication and control 614 allows access to electronically open, close, and lock circuit breakers. Further, circuit breaker indication and control 614 also provides an ability to monitor the state of circuit breakers for an aircraft.

Display systems 616 may provide an ability to view system synoptics 626 and maintenance pages 628. System synoptics 626 may include graphical representations of the real-time functions and status of aircraft systems. Maintenance pages 628 may include maintenance data pages for different types of information associated with specific aircraft systems, maintenance data pages for Air Transport Association (ATA) chapters, maintenance control pages, and/or other suitable maintenance pages or displays. In these examples, cabin services system maintenance 618 provides access to status and fault information for cabin services 412 in FIG. 4. Further, cabin services system maintenance 618 provides an ability to load software for cabin services 412 onto an aircraft.

In these illustrative examples, support functions 604 provide access to minimum equipment list 630, maintenance procedures 632, structural repair information 634, system description section 636, parts information 638, wiring and schematic information 640, fault isolation procedures 642, component locator 644, and help system 646.

Minimum equipment list 630 is the list of minimum aircraft equipment required for certified flight. Maintenance procedures 632 provide specific instructions on how to repair a given problem. Structural repair information 634 includes information on structural damage limits and repair information. System description section 636 provides background information describing how the various aircraft systems may work.

Parts information 638 contains information about parts that may be used to perform maintenance. For example, parts information may include information about a particular circuit that may be used to replace a faulty circuit on an aircraft. As another example, parts information 638 also contains information about how actions needed to reset a circuit. Of course, parts information 638 may be for any part on an aircraft. Schematic information 640 includes information about the layout of different circuits and systems on the aircraft.

Fault isolation procedures 642 include the procedures to be followed when diagnosing and repairing aircraft systems. Component locator 644 is used for determining the location of components within an aircraft's systems. Help system 646 may provide help information for the user of maintenance control display function 600 and laptop computer 500 in FIG. 5.

In maintenance control display function 600, aircraft functions 602 and support functions 604 is linked by electronic linkage 605. For example, electronic linkage 605 may allow maintenance control display function 600 to display information from support functions 604 for a corresponding displayed fault message for a system within aircraft functions 602.

The illustration of maintenance control display function 600 in FIG. 6 is not meant to imply physical or architectural limitations on the manner in which different advantageous embodiments may be implemented. Other components in addition and/or in place of the ones illustrated may be used. Some components may be unnecessary in some advantageous embodiments.

Also, the blocks are presented to illustrate some functional components. One or more of these blocks may be combined and/or divided into different blocks when implemented in different advantageous embodiments. For example, aircraft functions 602 and support functions 604 may include functions in addition to, or in place of the functions depicted.

Figure 7:
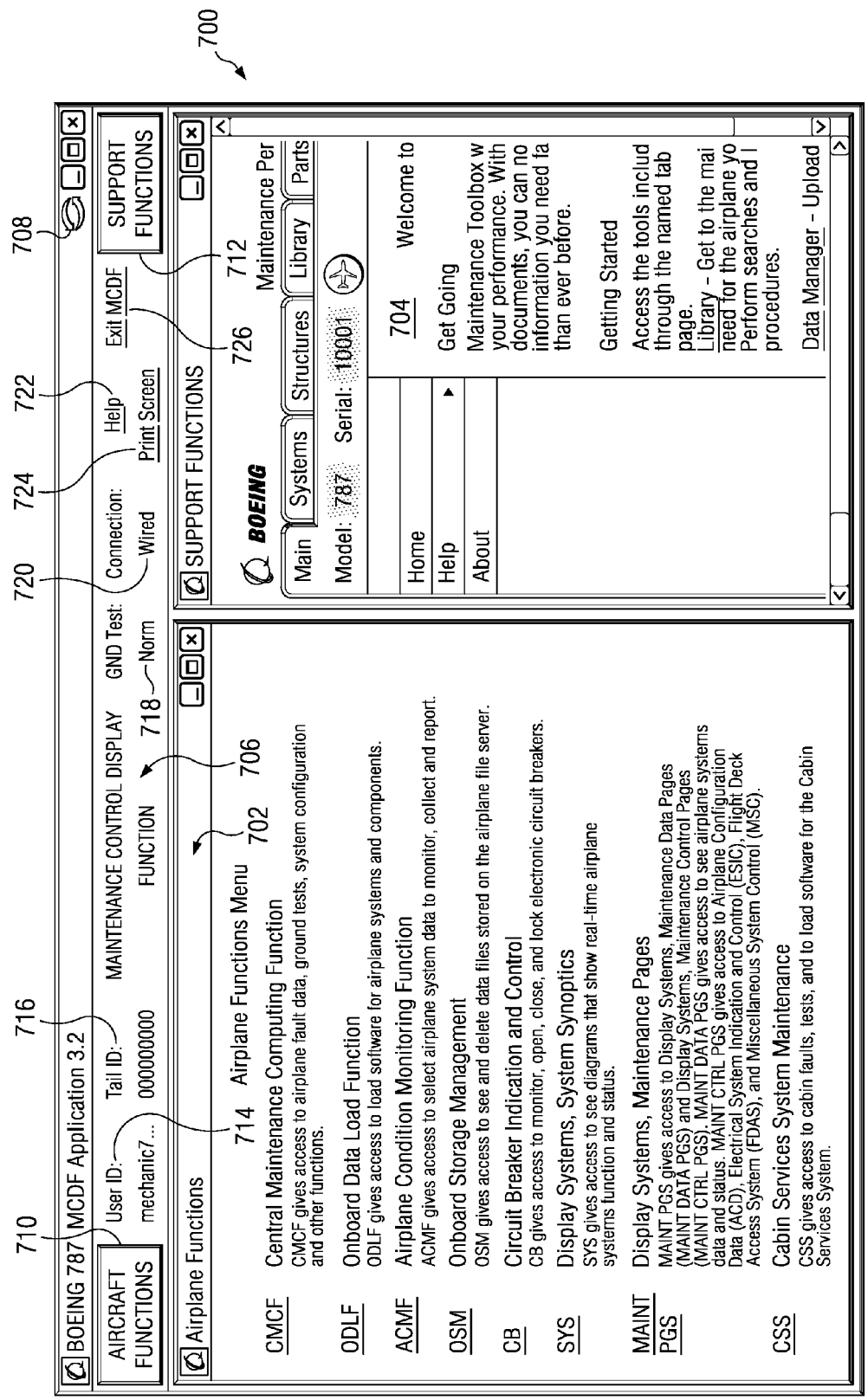
FIG. 7 is an illustration of a display of a maintenance control display function in accordance with an advantageous embodiment.

With reference now to FIG. 7, an illustration of a display of a maintenance control display function is depicted in accordance with an advantageous embodiment. Maintenance control display function 700 is one example of one display for maintenance control display function 600 in FIG. 6.

In these examples, maintenance control display function 700 may display aircraft functions window 702, support functions window 704, and banner window 706. Aircraft functions window 702 may display a menu for accessing aircraft functions such as, for example, aircraft functions 602 in FIG. 6. Support functions window 704 may display a toolbox for accessing information such as, for example, the information within support functions 604 in FIG. 6.

Banner window 706 may have connection symbol 708. Connection symbol 708 displays the status of the connection between maintenance control display function 700 and the aircraft. For example, the absence of connection symbol 708 may indicate that a connection is not active. Connection symbol 708 displayed as a clockwise turning symbol may indicate that a connection is active. Further, a stationary connection symbol 708 may indicate that the laptop computer on which maintenance control display function 700 is running is not operating properly or is frozen.

As illustrated, aircraft functions button 710 on banner window 706 is selected to display aircraft functions window 702. Further, support functions button 712 on banner window 706 is selected to display support functions window 704.

User ID tab 714 on banner window 706 indicates the user name of the operator of the laptop computer on which maintenance control display function 700 is displayed and running. Banner window 706 may also display tail ID tab 716. Tail ID tab 716 may indicate the identification of the aircraft to which the laptop computer is connected. If the laptop computer is not connected to an aircraft network, tail ID tab 716 may not display a tail identification.

GND Test tab 718 on banner window 706 indicates the position of the ground test switch in the flight deck of the aircraft to which the laptop computer is connected. For example, GND Test tab 718 may indicate "Norm", "Enable", or "Dataload/Enable". If the laptop computer is not connected to an aircraft network, GND Test tab 718 may not be displayed.

Banner window 706 may also display connection tab 720. Connection tab 720 may indicate the type of connection made between the laptop computer and the aircraft network. For example, possible types of connections may include "None", "Wireless Initial", "Wireless Limited", "Wireless Full", and "Wired".

In these illustrative examples, "Wired" and "Wireless Full" may be full connections that provide the laptop computer with the same full level of access to all aircraft systems within aircraft functions 602 in FIG. 6. "Wireless Limited" may indicate a limited wireless connection in which laptop computer 500 in FIG. 5 may have full access to onboard storage management 612 in FIG. 6, aircraft condition monitoring function 610 in FIG. 6, and cabin services system maintenance 618 in FIG. 6.

Further, a limited wireless connection may only provide partial access to central maintenance computing function 606 in FIG. 6 with all ground tests disabled. Thus, a limited wireless connection may not provide access to the other functions within aircraft functions 602 in FIG. 6.

In these examples, banner window 706 may also include and display help link 722, print screen link 724, and exit MCDF link 726. Help link 722 may provide a link to the laptop computer user guide for help with maintenance control display function 700. Print screen link 724 provides an ability to print the contents of the laptop computer screen and the display of maintenance control display function 700 using a printer on the flight deck of an aircraft. Exit MCDF link 726 allows the operator to close maintenance control display function 700 and thus, close aircraft functions window 702 and support functions window 704.

Figure 8:
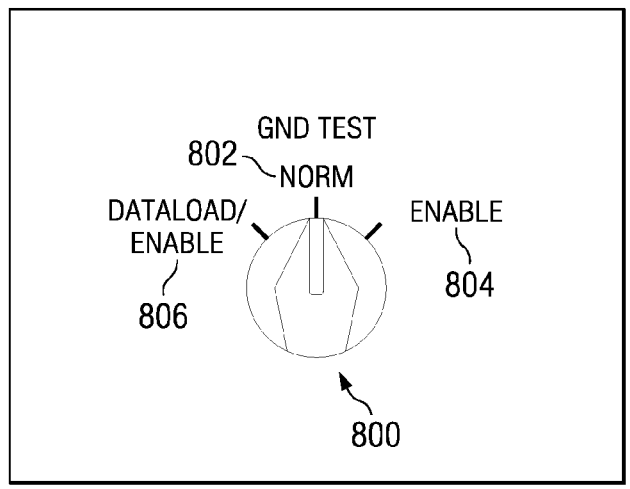
FIG. 8 is an illustration of a ground test switch in accordance with an advantageous embodiment.

With reference now to FIG. 8, an illustration of a ground test switch is depicted in accordance with an advantageous embodiment. Ground test switch 800 is a switch located on the flight deck of an aircraft. Ground test switch 800 may affect access of certain functions of aircraft systems from a laptop computer such as, for example, laptop computer 500 in FIG. 5.

In these examples, ground test switch 800 may be set to NORM position 802, ENABLE position 804, and DATALOAD/ENABLE position 806. The position of ground test switch 800 may be indicated on banner window 706 of maintenance control display function 700 in FIG. 7 for laptop computer 500 in FIG. 5. The position of ground test switch 800 may only affect the number of aircraft functions accessible by a laptop computer when the laptop computer has established a full wireless connection to the aircraft. For example, laptop computer 500 in FIG. 5 may have access to different functions of aircraft functions 602 with maintenance control display function 600 in FIG. 6 at different positions of ground test switch 800.

In NORM position 802, circuit breaker indication and control 614 in FIG. 6 may only be partially accessible. For example, an operator may only be able to view the states of the circuit breakers and may not be able to monitor, open, close, or lock the electronic circuit breakers of the aircraft.

In NORM position 802 and ENABLE position 804, onboard data load function 608 in FIG. 6 may not be accessible by laptop computer 500 in FIG. 5. In DATALOAD/ENABLE position 806, laptop computer 500 in FIG. 5 may have access to all functions within aircraft functions 602 using maintenance control display function 600 in FIG. 6.

Figure 9:
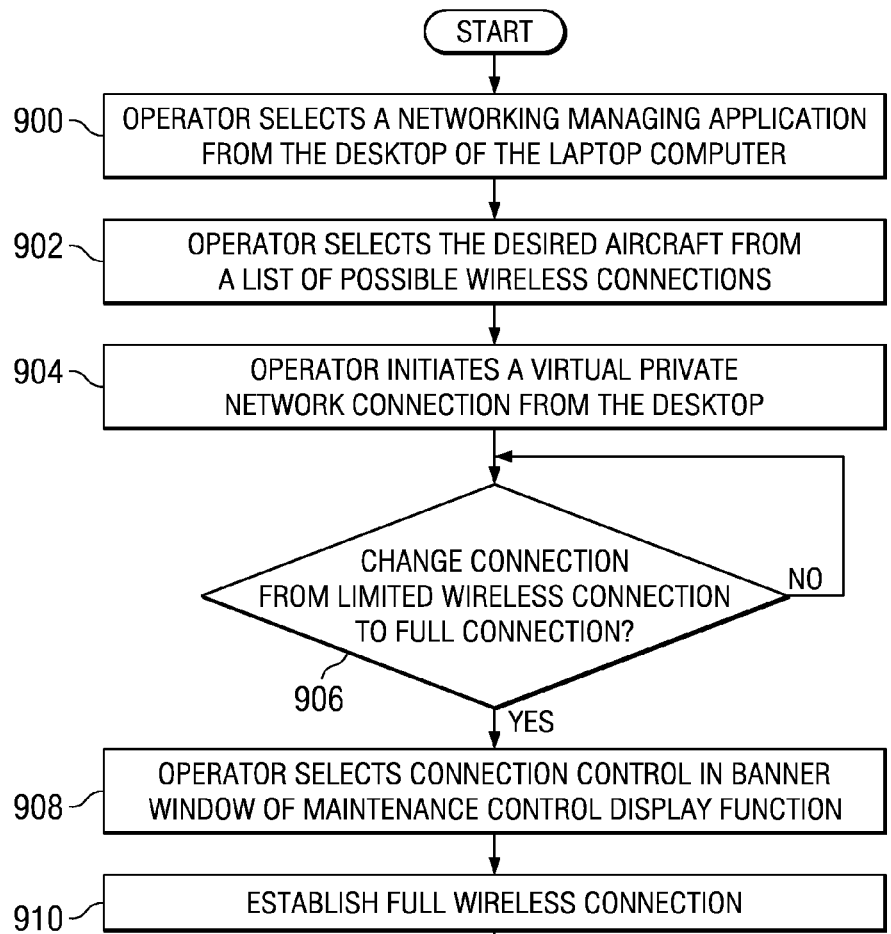
FIG. 9 is a flowchart of a process for establishing a wireless connection between a laptop computer and an aircraft in accordance with an advantageous embodiment.

With reference now to FIG. 9, a flowchart of a process for establishing a wireless connection between a laptop computer and an aircraft is depicted in accordance with an advantageous embodiment. The process illustrated in FIG. 9 may be implemented using a communications unit such as, for example, communications unit 310 in FIG. 3 for laptop computer 500 in FIG. 5 and aircraft 200 in FIG. 2.

The process begins by the operator selecting a network managing application from the desktop of the laptop computer (operation 900). In these examples, the network managing application may be network manager 515 in FIG. 5. The operator then selects the desired aircraft from a list of possible wireless connections (operation 902). The operator initiates a virtual private network connection from the desktop (operation 904). This connection may be made by selecting virtual private network 521 in FIG. 5.

Upon establishing a virtual private network connection, the laptop computer is wirelessly connected to the desired aircraft with a limited wireless connection in these illustrative examples. A determination is made as to whether to change the type of connection from a limited wireless connection to a full connection (operation 906). If the operator does not wish to establish a full wireless connection, the process may return to operation 906 until such time that the operator does wish to establish a full wireless connection.

If the operator decides to change the connection to a full wireless connection, the operator selects the connection control in the banner window of the maintenance control display function (operation 908). For example, the operator may select connection tab 720 on banner window 706 of maintenance control display function 700 in FIG. 7. This selection may result in a series of dialog boxes guiding the operator through the process of entering a code into an interphone in the cabin of the aircraft within a selected period of time.

In this manner, a full wireless connection is only established when the laptop computer is operated within the aircraft. Thus, the operator is required to complete a physical verification in the aircraft. Upon completion of the physical verification, a full wireless connection is established (operation 910), with the process terminating thereafter.

Figure 10:
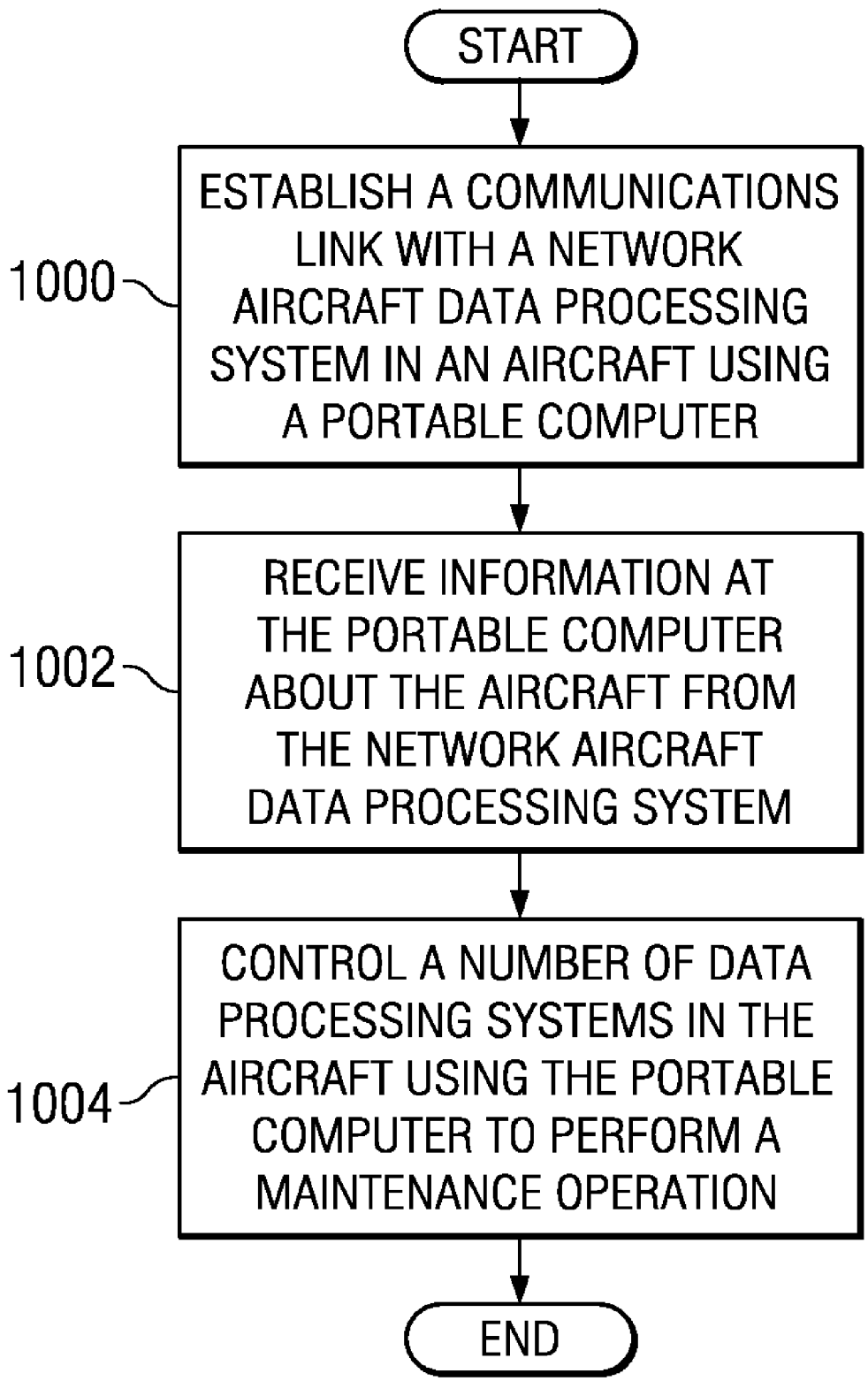
FIG. 10 is a flowchart of a process for performing maintenance operations in accordance with an advantageous embodiment.

With reference now to FIG. 10, a flowchart of a process for performing maintenance operations is depicted in accordance with an advantageous embodiment. The process may be implemented in a laptop computer such as, for example, laptop computer 500 in FIG. 5.

The process begins by establishing a communications link with a network aircraft data processing system in an aircraft using a portable computer (operation 1000). The process then receives information at the portable computer about the aircraft from the network aircraft data processing system (operation 1002). The process controls a number of data processing systems in the aircraft using the portable computer to perform a maintenance operation (operation 1004), with the process terminating thereafter.

Figure 11:
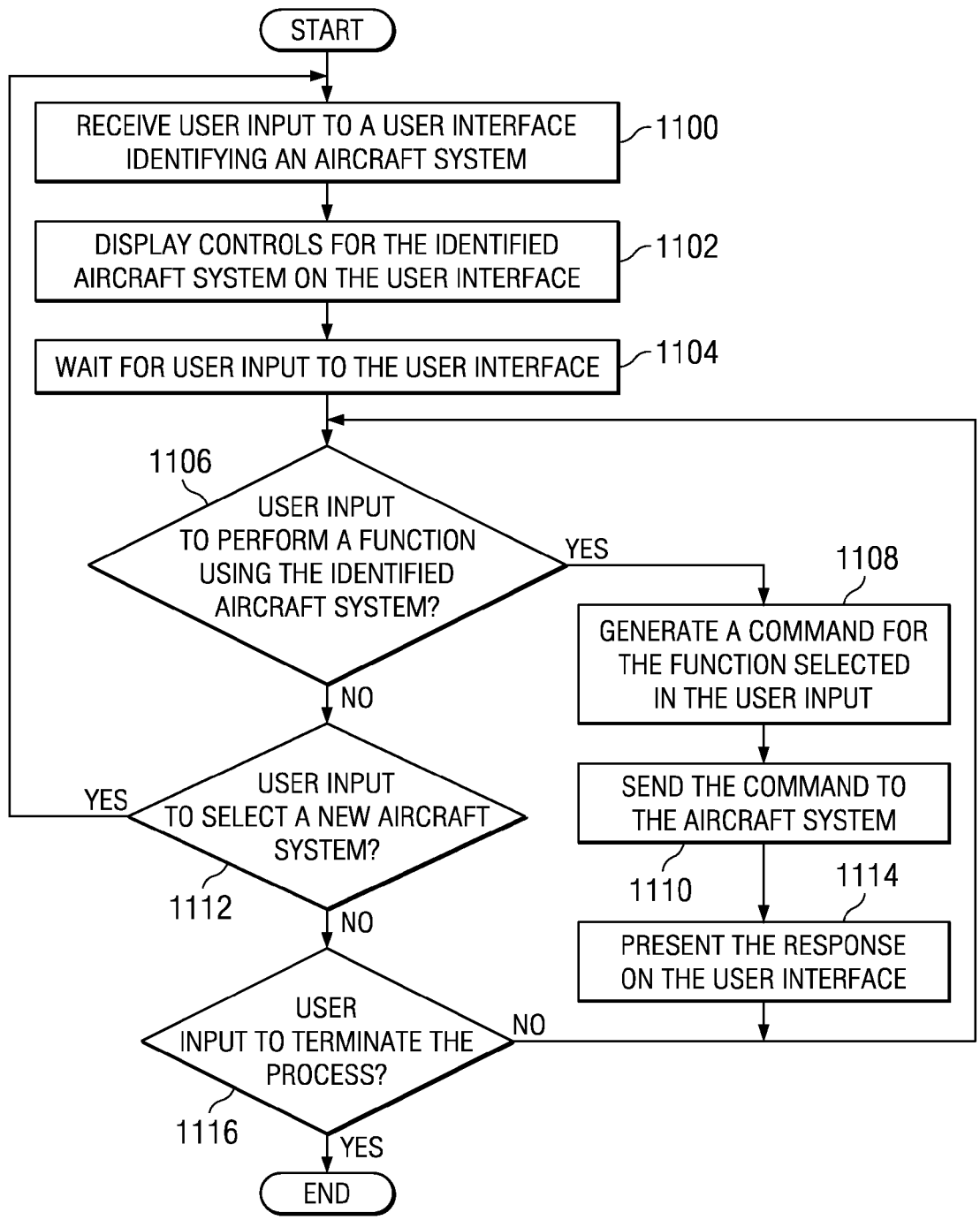
FIG. 11 is a flowchart of a process for performing a maintenance solution using a laptop computer in accordance with an advantageous embodiment.

With reference to FIG. 11, a flowchart of a process for performing a maintenance solution using a laptop computer is depicted in accordance with an advantageous embodiment. The process illustrated in FIG. 11 may be implemented using a laptop computer such as, for example, laptop computer 500 in FIG. 5. This process may be implemented in a software component such as, for example, maintenance control display function 501 in FIG. 5.

The process begins by receiving user input to a user interface identifying an aircraft system (operation 1100). The process displays controls for the identified aircraft system on the user interface (operation 1102). The process then waits for user input to the user interface (operation 1104). When a user input is received, a determination is then made as to whether the user input is to perform a function using the identified aircraft system (operation 1106). In these examples, the function may be to set a parameter, to reset a breaker, to change a position of a control surface, to obtain status information, to upload software, and/or to perform some other suitable function.

If the user input is to perform a function, the process generates a command for the function selected in the user input (1108). The process then sends the command to the aircraft system (operation 1110). The command may be sent directly to the aircraft system or to a line replaceable unit that controls the aircraft system. The process then presents the response on the user interface (operation 1114), with the process returning to operation 1106 as described above.

With reference again to operation 1106, if the user input is not to perform a function, a determination is made as to whether the user input is to select a new aircraft system (operation 1112). If the user input is to select a new aircraft system, the process returns to operation 1100 as described above. Otherwise, the process determines whether the user input terminates the process (operation 1116). If the user input does not terminate the process, the process returns to operation 1106. Otherwise, the process terminates.

Figure 12:
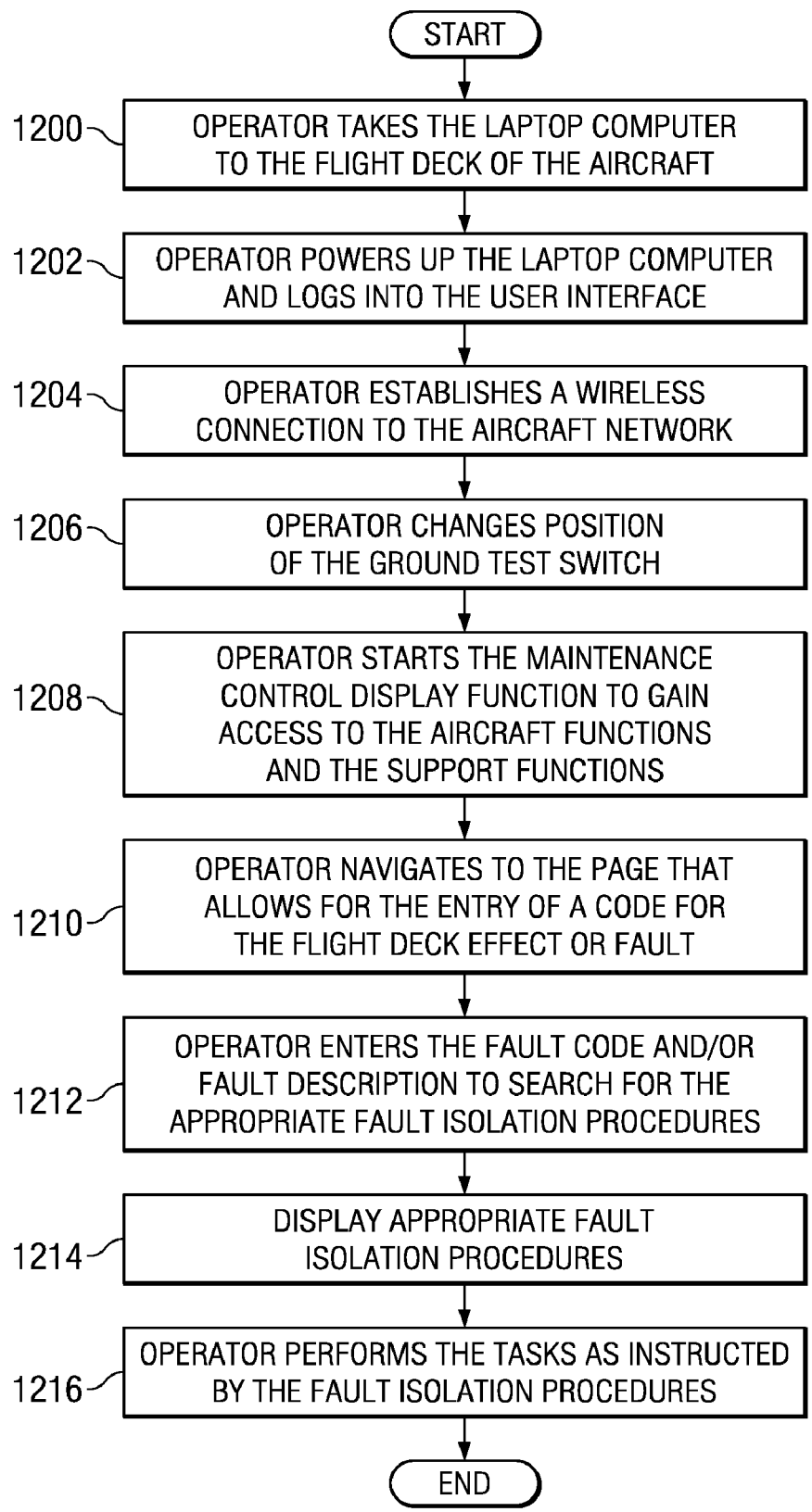
FIG. 12 is a flowchart of a process for performing a maintenance solution in an aircraft in accordance with an advantageous embodiment.

With reference now to FIG. 12, a flowchart of a process for performing a maintenance solution in an aircraft is depicted in accordance with an advantageous embodiment. This method may be implemented by an operator using a laptop computer such as, for example, laptop computer 500 in FIG. 5 and maintenance control display function 600 in FIG. 6. Further, this method may be implemented after an operator has reviewed fault data for a flight deck effect.

The operator begins by taking the laptop computer to the flight deck of the aircraft (operation 1200). The operator powers up the laptop computer and logs into the user interface (operation 1202). The operator then establishes a wireless connection to the aircraft network (operation 1204). The operator changes the position of the ground test switch to an enable position to place the aircraft in maintenance mode (operation 1206). The ground test switch position may be a factor in determining the accessibility of the aircraft functions.

Thereafter, the operator starts the maintenance control display function to gain access to the aircraft functions and the support functions (operation 1208). The operator navigates to the page that allows for the entry of a code for the flight deck effect or fault (operation 1210). The flight deck effect or fault is the error or discrepancy as observed at the flight deck. Each flight deck effect or fault may have a specific code or textual description identifying the specific flight deck effect or fault.

The operator enters the fault code and/or fault description to search for the appropriate fault isolation procedures (operation 1212). The appropriate fault isolation procedures are displayed (operation 1214). The operator performs the tasks as instructed by the fault isolation procedures (operation 1216), with the process terminating thereafter. For example, the fault isolation procedures may instruct an operator to cycle a circuit breaker by opening and closing the circuit breaker. In other examples, the fault isolation procedures may instruct an operator to change the state of a circuit breaker.

As another example, in some advantageous embodiments, placing the aircraft in a maintenance mode in operation 1206 may be unnecessary or may be occur automatically when the laptop computer establishes a wireless connection to the aircraft. As another example, in other advantageous embodiments, a wired connection also may be used.

Figure 13:
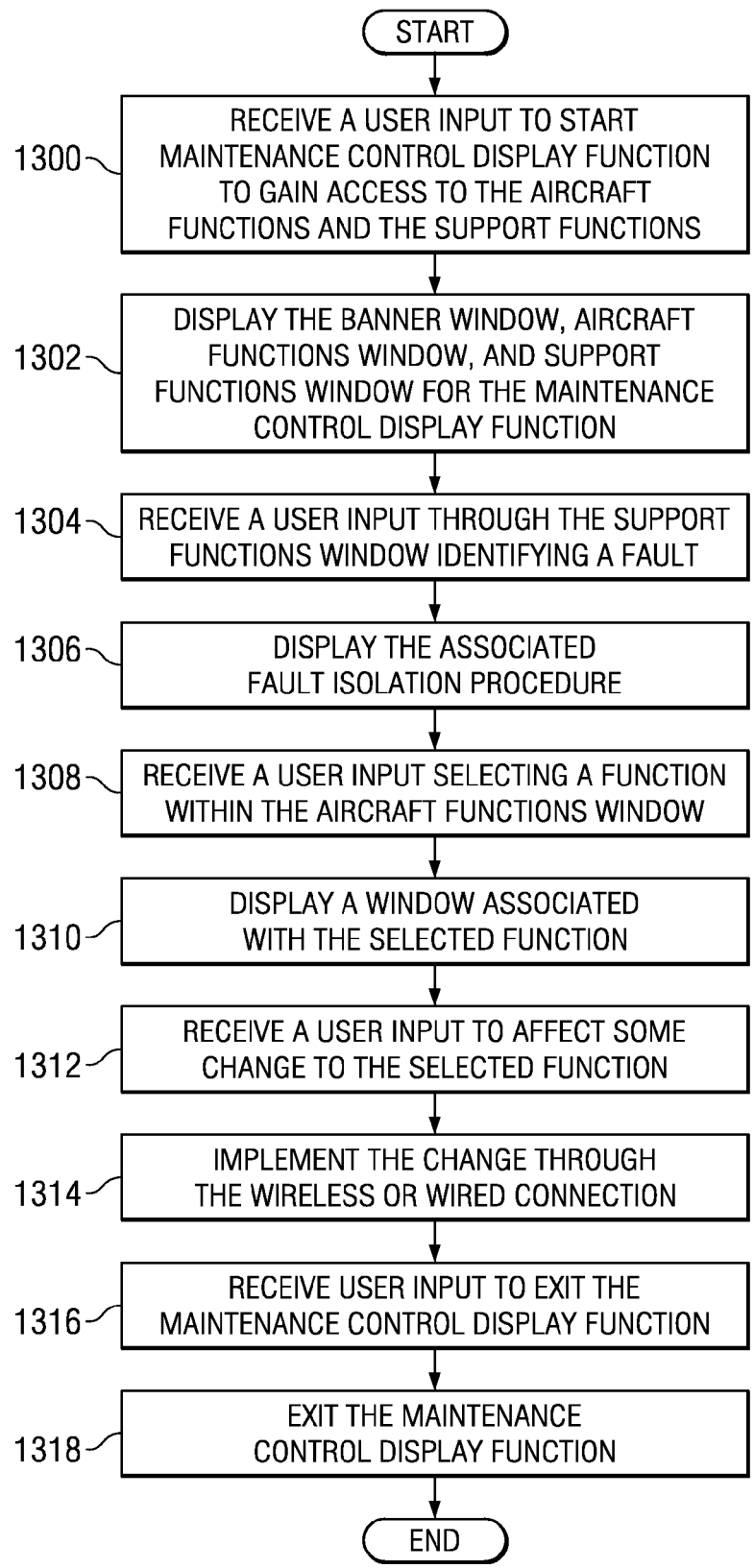
FIG. 13 is a flowchart of a process for accessing and controlling aircraft systems in accordance with an advantageous embodiment.

With reference now to FIG. 13, a flowchart of a process for accessing and controlling aircraft systems is depicted in accordance with an advantageous embodiment. The process illustrated in FIG. 13 may be executed using a laptop computer such as, for example, laptop computer 500 in FIG. 5. This process may be implemented in a software component such as for example, maintenance control display function 501 in FIG. 5.

The process begins by receiving a user input to start the maintenance control display function to gain access to the aircraft functions and the support functions (operation 1300). The process then displays the banner window, aircraft functions window, and support functions window for the maintenance control display function (operation 1302). These windows are examples of banner window 706, aircraft functions window 702, and support functions window 704 for maintenance control display function 700 in FIG. 7.

The process receives a user input through the support functions window identifying a fault (operation 1304). For example, an operator may input a code or textual description indicating a specific fault. In these examples, the specific fault may be, for example, a tripped circuit breaker, a control surface with a rigging out of tolerance, or some other suitable discrepancy. The process displays the associated fault isolation procedure (operation 1306). For example, the process may display instructions for cycling a specific circuit breaker within the aircraft.

Thereafter, the process then receives a user input selecting a function within the aircraft functions window (operation 1308). In this illustrative example, the selected function is a function within an aircraft system that is controlled to perform maintenance on the fault. For example, the operator may select circuit breaker indication and control 614 of airport functions 602 in FIG. 6. The process displays a window associated with the selected function (1310).

Then, the process receives a user input to affect some change to the selected function (1312). For example, the process may receive a user input to open and close the circuit breaker in order to cycle the circuit breaker. The process implements this change through the wireless or wired connection of the laptop computer to the aircraft (operation 1314). After operation 1314, the process may receive user input to exit the maintenance control display function (operation 1316) and may then exit the maintenance control display function (operation 1318), with the process terminating thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art.

Although the different advantageous embodiments have been described with respect to aircraft, other advantageous embodiments may be applied to other types of objects. For example, without limitation, other advantageous embodiments may be applied to a mobile platform, a stationary platform, a land-based structure, an aquatic-based structure, a space-based structure and/or some other suitable object.

More specifically, the different advantageous embodiments may be applied to, for example, without limitation, a submarine, a bus, a personnel carrier, tank, a train, an automobile, a spacecraft, a space station, a satellite, a surface ship, a power plant, a dam, a manufacturing facility, a building and/or some other suitable object.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a portable computer; and
program code stored on the portable computer, wherein the program code is capable of being executed to establish a communications link with an aircraft network data processing system in an aircraft, obtain information about the aircraft over the communications link, display the information on a display device for the portable computer, receive user input to control a data processing system on the aircraft network data processing system in the aircraft, and send a number of commands to the data processing system in response to receiving the user input for controlling a circuit breaker and contactor process capable of obtaining and manipulating a state of circuit breakers and contactors on the aircraft, and wherein the program code is configured to access a flight control rigging process capable of rigging flight control surfaces on the aircraft and control rigging flight controls in the aircraft.

2. The apparatus of claim 1, wherein the program code comprises program code for at least one of a health and fault information process capable of accessing health and fault information on the aircraft; an aircraft system information process capable of accessing status information for the aircraft; and an aircraft support information access process capable of accessing support information for the aircraft.

3. The apparatus of claim 2, wherein the health and fault information comprises one of a failure of a line replaceable unit, a status of the line replaceable unit, a status of an electrical system.

4. The apparatus of claim 2, wherein the support information comprises one of a maintenance manual, a minimum equipment list, illustrations of parts, a fault isolation manual, and an aircraft and maintenance log book.

5. The apparatus of claim 2, wherein the circuit breaker and contactor process obtains and manipulates the state of circuit breakers and contactors on the aircraft through a circuit breaker indication and control in the aircraft.

6. The apparatus of claim 2, wherein the support information is stored on a laptop computer.

7. The apparatus of claim 2, wherein the aircraft support information access process is capable of integrating the support information with the status information accessed by the aircraft system information process.

8. An apparatus for performing maintenance operations on an aircraft, the apparatus comprising:
a health and fault information process capable of accessing health and fault information on the aircraft;
an aircraft system information process capable of accessing status information for the aircraft;
an aircraft support information access process capable of accessing support information for the aircraft;
a flight control rigging process configured to rig flight control surfaces on the aircraft;
a circuit breaker and contactor process capable of obtaining and manipulating a state of circuit breakers and contactors on the aircraft; and
a laptop computer, wherein the laptop computer is capable of establishing a wireless communications link with an aircraft network data processing system located within a selected distance of the laptop computer and wherein the health and fault information process, the aircraft support information access process, the aircraft system information process, the flight control rigging process, and the circuit breaker and contactor process execute on the laptop computer.

9. The apparatus of claim 8, wherein the health and fault information comprises one of a failure of a line replaceable unit, a status of the line replaceable unit, a status of an electrical system.

10. The apparatus of claim 8, wherein the support information comprises one of a maintenance manual, a minimum equipment list, illustrations of parts, a fault isolation manual, and an aircraft and maintenance log book.

11. The apparatus of claim 8, wherein the flight control rigging process is capable of controlling rigging flight controls on the aircraft through the rigging flight controls in the aircraft.

12. The apparatus of claim 8, wherein the circuit breaker and contactor process obtains and manipulates the state of circuit breakers and contactors on the aircraft through a circuit breaker indication and control in the aircraft.

13. The apparatus of claim 8, wherein the support information is stored on the laptop computer.

14. The apparatus of claim 8, wherein the aircraft support information access process is capable of integrating the support information with the status information accessed by the aircraft system information process.

15. A method for performing maintenance operations, the method comprising:
establishing a communications link with an aircraft network data processing system in an aircraft using a portable computer;
receiving information at the portable computer about the aircraft from the aircraft network data processing system; and
controlling a number of data processing systems in the aircraft using the portable computer to perform a maintenance operation including a circuit breaker and contactor process capable of obtaining and manipulating a state of circuit breakers and contactors on the aircraft and also including controlling access to a flight control rigging process capable of rigging flight control surfaces on the aircraft.

16. The method of claim 15, wherein the communications link is selected from one of a wired connection and a wireless connection.

17. The method of claim 15, wherein the number of data processing systems comprises at least one of a number of line replaceable units.

18. The method of claim 17, wherein the number of line replaceable units is at least one of rigging flight controls, a central server module, an electronic flight bag, cabin services, and circuit breaker and controls.

19. A computer program product for performing maintenance operations, the computer program product comprising:
a non-transitory computer recordable storage medium;
program code, stored on the computer recordable storage medium, for establishing a communications link with an aircraft network data processing system in an aircraft using a portable computer;
program code, stored on the computer recordable storage medium, for receiving information at the portable computer about the aircraft from the aircraft network data processing system; and
program code, stored on the computer recordable storage medium, for controlling a number of data processing systems in the aircraft using the portable computer to perform a maintenance operation including at a circuit breaker and contactor process capable of obtaining and manipulating a state of circuit breakers and contactors on the aircraft.

20. An apparatus comprising:
a portable computer; and
program code stored on the portable computer, wherein the program code is capable of being executed to establish a communications link with an aircraft network data processing system in an aircraft, obtain information about the aircraft over the communications link, display the information on a display device for the portable computer, receive user input to control a data processing system on the aircraft network data processing system in the aircraft, and send a number of commands to the data processing system in response to receiving the user input for controlling a flight control rigging process capable of rigging flight control surfaces on the aircraft.

* * * * *